United States Patent
Gyurko

(10) Patent No.: US 9,298,289 B2
(45) Date of Patent: Mar. 29, 2016

(54) METHOD AND APPARATUS FOR ADJUSTING A FUNCTION OF AN ELECTRONIC DEVICE

(75) Inventor: Zsolt Gyurko, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 242 days.

(21) Appl. No.: 13/131,890

(22) PCT Filed: Jun. 10, 2010

(86) PCT No.: PCT/EP2010/003495
§ 371 (c)(1),
(2), (4) Date: May 31, 2011

(87) PCT Pub. No.: WO2011/154021
PCT Pub. Date: Dec. 15, 2011

(65) Prior Publication Data
US 2013/0069902 A1    Mar. 21, 2013

(51) Int. Cl.
*G06F 3/041* (2006.01)
*H04M 1/60* (2006.01)

(52) U.S. Cl.
CPC ............. *G06F 3/041* (2013.01); *H04M 1/6058* (2013.01)

(58) Field of Classification Search
None
See application file for complete search history.

(56) References Cited

U.S. PATENT DOCUMENTS

| | | | |
|---|---|---|---|
| 4,558,261 A | 12/1985 | Cheng | |
| 8,405,528 B2* | 3/2013 | Aghaei et al. | 341/33 |
| 2004/0037051 A1* | 2/2004 | Hagiwara et al. | 361/749 |
| 2004/0195919 A1 | 10/2004 | Gasperi et al. | |
| 2007/0132740 A1* | 6/2007 | Meiby | 345/173 |
| 2011/0285554 A1* | 11/2011 | Aghaei et al. | 341/33 |

FOREIGN PATENT DOCUMENTS

| | | |
|---|---|---|
| CN | 101631157 A | 1/2010 |
| DE | 202006010640 U1 | 11/2006 |
| KR | 100777383 B1 | 11/2007 |

OTHER PUBLICATIONS

Ivan Poupyrev et al., "Sensing human activities with resonant tuning," Dysney Research Pittsburgh (USA), Apr. 10, 2010, pp. 1-6.
International Search Report; Apr. 7, 2011; issued in International Patent Application No. PCT/EP/2010/003495.
Written Opinion of the International Searching Authority; Apr. 7, 2011; issued in International Patent Application No. PCT/EP/2010/003495.

* cited by examiner

*Primary Examiner* — David D Davis
(74) *Attorney, Agent, or Firm* — James C. Edwards; Moore & Van Allen PLLC

(57) ABSTRACT

A method for adjusting a function of an electronic device (1) is provided. According to the method, a conductive wire (5) that is coupled to an electronic circuit (6) of the electronic device (1) is provided. The electronic circuit (6) is adapted to generate an output signal (f) depending on an inductivity $L_0$ (21) influenced by a user touching the conductive wire (5). On the basis of the output signal (T) the inductivity $L_0$ (21) is determined. Depending on the determined inductivity $L_0$ (21) the function of the electronic device (1) is adjusted.

20 Claims, 2 Drawing Sheets

METHOD AND APPARATUS FOR ADJUSTING A FUNCTION OF AN ELECTRONIC DEVICE

The present invention relates to a method and an apparatus for adjusting a function of an electronic device, especially for adjusting a function by touching a wire or cable connected to the electronic device, for example a wire or cable connecting the electronic device to a headset.

BACKGROUND OF THE INVENTION

Mobile devices, for example mobile phones and mobile media players, are becoming more and more compact and at the same time the number of functions provided by those mobile devices is rising permanently. For adjusting and using the functions of the mobile device, the mobile device provides several control devices, for example a touchscreen or buttons. However, the space for providing these control devices is limited and when the mobile device is accommodated in a pocket, the user has to fetch out the mobile device before the control devices can be operated.

Therefore, there is a need to provide additional and more convenient operating devices for mobile devices.

SUMMARY OF THE INVENTION

According to the present invention, this object is achieved by a method for adjusting a function of an electronic device as defined in claim 1 and an apparatus for adjusting a function of an electronic device as defined in claim 11. The dependent claims define preferred and advantageous embodiments of the invention.

According to an aspect of the invention, a method for adjusting a function of an electronic device is provided. According to the method, a conductive wire is provided which is coupled to an electronic circuit of the electronic device. The conductive wire may be included in a wire or cable for connecting the electronic device to an accessory like a microphone, a headphone or a charger. The electronic circuit is adapted to generate an output signal which depends on an inductivity which is influenced by a user touching the conductive wire. On the basis of the output signal the inductivity is determined and depending on the determined inductivity the function of the electronic device is adjusted.

When a user touches the conductive wire a capacity between the wire and ground and the inductivity seen by the electronic circuit are changing due to the human body of the user touching the wire. However, the change in capacity mainly depends on the additional capacity introduced by the human body, whereas the inductivity mainly depends on the position where the user touches the conductive wire. Therefore, the position where the user touches the wire can be derived from the inductivity and specific positions on the conductive wire can be defined for specific functions of the electronic device and activating or adjusting the function of the electronic device can be performed by determining the inductivity seen by the electronic circuit introduced by the user touching the conductive wire.

In the present invention the term "where the user touches the conductive wire" includes a direct touching of the conductive wire as well as an indirect touching of the conductive wire, e.g. a touching of an isolating cover or insulating surrounding the conductive wire or touching a cable comprising several wires including the conductive wire.

According to an embodiment, the electronic circuit comprises an oscillator circuit generating the output signal. The output signal provides a frequency which depends on the capacity and the inductivity which are both influenced by the user touching the conductive wire. By using an oscillator circuit the inductivity and the capacity can be converted easily and at low cost into a frequency signal which may be evaluated by the electronic device for adjusting the function of the electronic device.

According to another embodiment, the inductivity can be determined on the basis of the output signal of the oscillator circuit by the following steps: First, a first frequency of the output signal of the oscillator circuit is determined. Then, a capacitive element is coupled to the conductive wire. While the capacitive element is coupled to the conductive wire, a second frequency of the output signal of the oscillator circuit is determined. On the basis of the first frequency and the second frequency the inductivity is determined. When the user touches the conductive wire, the inductivity introduced by the user as well as the capacity introduced by the user are both unknown. By coupling or decoupling the capacitive element to the conductive wire the oscillator circuit is running in two different operating states. Both operating states are influenced by the capacity and the inductivity introduced by the user touching the conductive wire. Therefore, the two unknown values for the capacity and the inductivity introduced by the user touching the conductive wire can be determined from the first frequency of the oscillator circuit running in the operating state with the capacitive element decoupled from the conductive wire and from the second frequency of the oscillator circuit running in the operating state with the capacitive element coupled to the conductive wire. Therefore, a reliable determination of the inductivity and therefore of the position where the user touches the conductive wire can be determined.

According to another embodiment, the function of the electronic device is adjusted by looking up an adjustment value in a look-up table which provides a correlation between the inductivity and the adjustment value. The adjustment values in the look-up table may comprise for example volume values for an audio reproduction volume of audio data to be played back by the electronic device or different functions which may be activated or deactivated by the user touching the conductive wire at specific positions.

According to another embodiment, a plurality of positions where the user touches the conductive wire are consecutively determined by respectively determining the inductivity. Based on the plurality of positions a moving direction of the position where the user touches the conductive wire along the conductive wire is determined. The function of the electronic device is adjusted based on the determined moving direction. By consecutively determining a plurality of positions where the user touches the conductive wire the moving direction where the user touches the wire along the wire can be easily determined and functions of the mobile devices, for example a volume adjustment, can be intuitively adjusted by the user by simply moving a finger along the conductive wire.

According to another embodiment a plurality of positions where the user touches the conductive wire are consecutively determined by respectively determining the inductivity. Based on the plurality of positions the moving the speed of the position where the user touches the conductive wire along the conductive wire is determined. The function of the electronic device is adjusted based on the determined moving speed. Functions of the electronic device, for example finding a play back position within an audio file, can be facilitated by using the determined moving speed. For example, when the user is moving a finger slowly along the conductive wire, the play back position within the audio file is varied in small steps, whereas the play back position within the audio file is varied in larger steps, when the user moves the finger faster along the conductive wire.

According to an embodiment, the electronic device comprises a device selected from the group comprising a mobile phone, a personal digital assistant, a mobile navigation system, a mobile media player, a Bluetooth headset controller, and a mobile computer.

According to another aspect of the present invention, an apparatus for adjusting a function of an electronic device is provided. The apparatus comprises an electronic circuit which is coupled to a conductive wire of the electronic device. The electronic circuit is adapted to generate an output signal based on an inductivity seen by the electronic circuit induced by a user touching the conductive wire. The apparatus furthermore comprises a detector unit which receives the output signal of the electronic circuit and determines the inductivity on the basis of the output signal. Finally, the apparatus comprises a control unit for adjusting the function of the electronic device depending on the inductivity determined by the detector unit.

According to an embodiment, the electronic circuit comprises an oscillator circuit which generates the output signal. The output signal has a frequency which depends on a capacity and the inductivity which are both influenced by the user touching the conductive wire. Furthermore, the apparatus may comprise a switching element controlled by the control unit, and a capacitive element which can be coupled via the switching element to the conductive wire. The control unit may be adapted to determine a first frequency of the output signal of the oscillator circuit during a time the capacitive element is not coupled to the conductive wire, and to determine a second frequency of the output signal of the oscillator circuit during a time the capacitive element is coupled to the conductive wire. Finally, the detector unit is adapted to determine the inductivity on the basis of the first frequency and the second frequency.

Furthermore, the apparatus may be adapted to perform the above-described method and comprise therefore the above-described advantages.

The apparatus may be included in a mobile phone, a personal digital assistant, a mobile navigation system, a mobile media player, a Bluetooth headset controller, or a mobile computer.

Although specific features described in the above summary and the following detailed description are described in connection with specific embodiments, it is to be understood that the features of the embodiments can be combined with each other unless denoted otherwise.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the present invention will be described in detail. It is to be understood that the following description is given only for the purpose of illustrating the principles of the invention and is not to be taken in a limiting sense. Rather, the scope of the invention is defined only by the appended claims and not intended to be limited by the exemplary embodiments hereinafter.

It is to be understood that the features of the various exemplary embodiments described herein may be combined with each other unless specifically noted otherwise. Same reference signs in the various instances of the drawings refer to similar or identical components.

Figure 1:
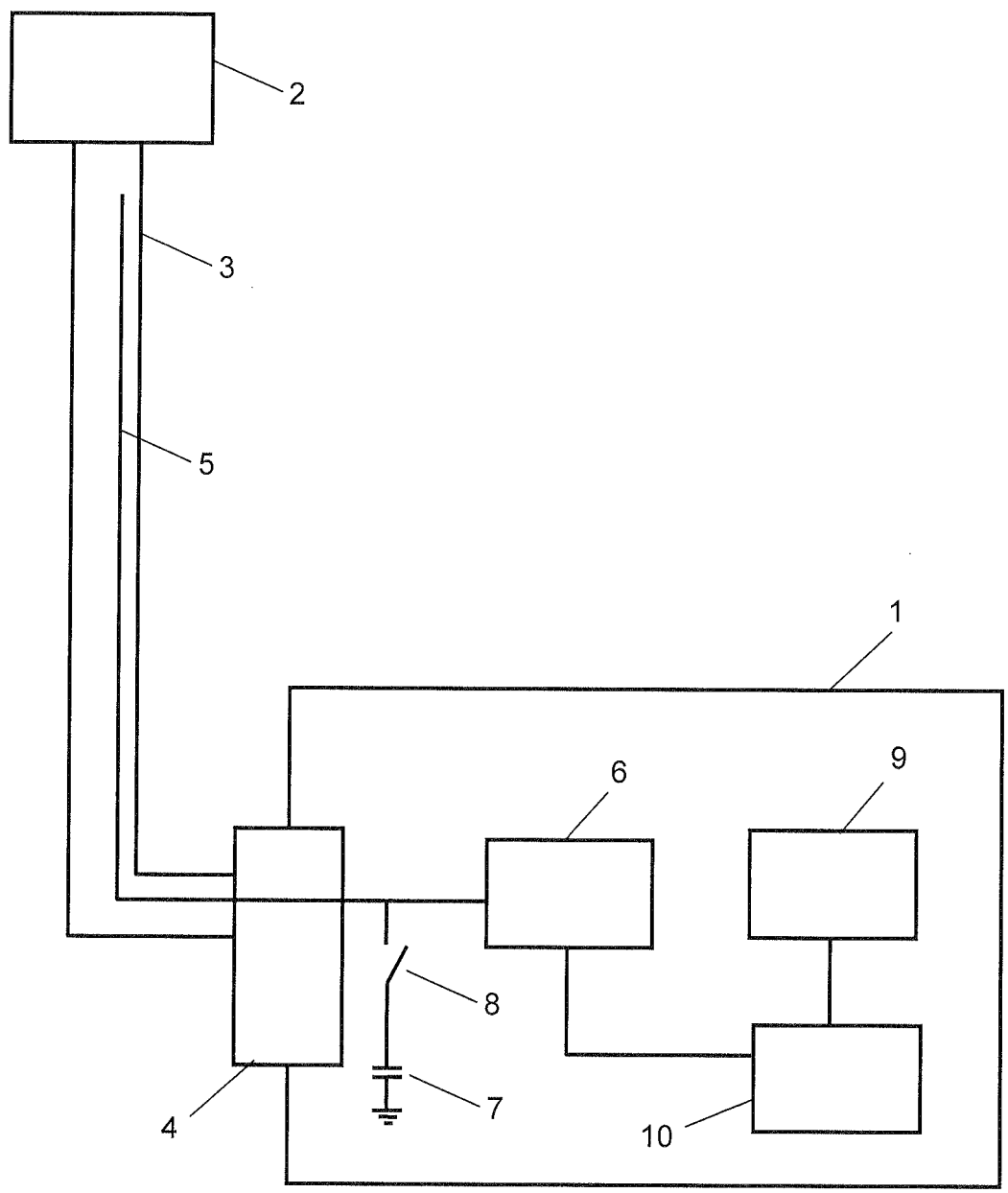
FIG. 1 shows a block diagram of an electronic device according to an embodiment of the present invention.

FIG. 1 shows a block diagram of a mobile device 1, for example a mobile phone, which is connected to a headset 2 via a headset cable 3. The headset cable 3 and the headset 2 are examples only and the mobile device 1 may be coupled in the same way to a microphone 2 via a microphone cable 3 or to a charger 2 via a charger cable 3. The headset cable 3 is connected to the mobile device 1 via an interface connector 4. The interface connector 4 provides electrical contacts for connecting components of the headset 2 to the mobile device 1 via electrical wires (not shown) in the headset cable 3. Additionally, the headset cable 3 comprises a conductive wire 5 which is not connected to the headset 2 but used as an antenna wire for detecting a user touching the headset cable 3. The conductive wire 5 is connected via the interface connector 4 to an oscillator circuit 6 of the mobile device 1. Additionally, a first side of a capacitor 7 can be connected to the oscillator circuit 6 via a switch 8. The other side of the capacitor 7 is connected to ground. The switch 8 is controllable by a control unit 9 of the mobile device 1. The oscillator circuit 6 generates a frequency signal which depends on a capacity and an inductivity provided by the conductive wire 5 and on the capacitor 7 if the switch 8 is closed. When the switch 8 is open, the frequency of the oscillator circuit 6 depends only on the capacity and inductivity provided by the conductive wire 5. The frequency signal generated by the oscillator circuit 6 is detected by a detector circuit 10 of the mobile device 1. Depending on the frequencies detected by a detector unit 10 the control unit 9 activates or adjusts functions of the mobile device 1.

The functionality of the oscillator circuit 6 in connection with the conductive wire 5 and the capacitor 7 will now be described in detail. As described above and as will be described below in connection with FIG. 2, the oscillator circuit 6 is tuned depending on the inductivity and capacity provided by the conductive wire 5. If a part of a human body, for example a finger of a user of the mobile device 1, touches the conductive wire 5 by touching the headset cable 3, the human body will form an LC circuit which tunes the frequency of the oscillator circuit 6. This frequency can be measured by the frequency detector unit 10. When the headset cable 3 is touched at different positions this will result in different frequency values and therefore it is possible to determine the touching position or a moving of a finger along the cable 3. To determine the exact position two probing activities are needed as will be described in detail later in connection with FIG. 2. To achieve two different probing activities, first, the oscillator circuit 6 is oscillating with the switch 8 in an open state which will result in a first frequency value f1, and after this the switch 8 is closed and a second frequency value f2 is generated by the oscillator circuit 6 and determined by the detector unit 10. From these two frequency values f1 and f2 the capacity and inductivity values induced by the conductive wire and the human body can be determined, wherein the inductivity value indicates the position where the user touches the wire. The control unit 9 may use for example a look-up table to determine the position where the user touches the headset cable 6 on the basis of the determined inductivity.

Figure 2:
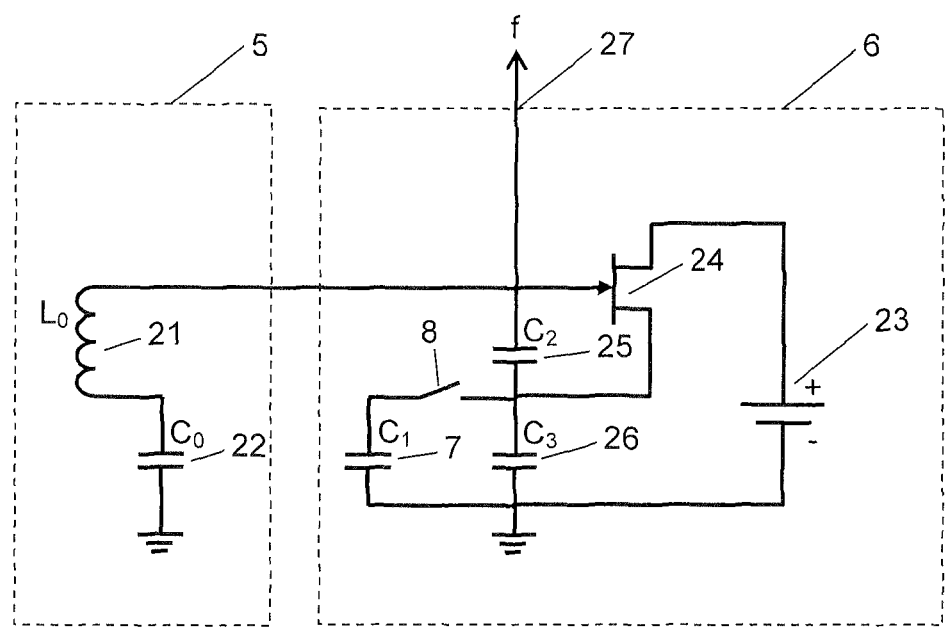
FIG. 2 shows a circuit diagram of an embodiment of an oscillator circuit connected to a conductive wire touched by a user.

FIG. 2 shows an embodiment of the oscillator circuit 6 in connection with the conductive wire 5 of FIG. 1 in more detail. The conductive wire 5 is shown in FIG. 2 as an equivalent circuit diagram representing the conductive wire being touched by a user as an inductivity $L_0$ 21 and a capacity $C_0$ 22. The oscillator circuit 6 comprises a power supply 23, a switching element 24, two capacitors 25 and 26 ($C_2$ and $C_3$) and the capacitor 7 ($C_1$) coupled in parallel to capacitor 26 via the switch 8. Thus, the capacitors $C_1$-$C_3$, the equivalent capacity $C_0$ and the equivalent inductivity $L_0$ form an LC oscillator circuit providing an output signal f at an output 27 of the oscillator circuit 6. The switching element 24 may be for example a transistor and is the active element of the oscillator circuit 6. The output frequency f depends on the equivalent capacity $C_0$, the equivalent inductivity $L_0$ and on the switching state of switch 8.

To determine a position where the user touches the conductive wire 5 the oscillator circuit 6 can be operated as described in the following. The equivalent capacity $C_0$ represents the capacitance of the human body touching the conductive wire 5. The equivalent inductivity $L_0$ represents the inductance of the conductive wire 5 which is influenced by the touching position where the user touches the conductive wire 5. To determine the touch position on the conductive wire 5 the equivalent inductivity $L_0$ has to be determined. As the equivalent capacity $C_0$ is also unknown, as it depends on the human body touching the conductive wire 5, also the equivalent capacity $C_0$ has to be determined. Therefore, the oscillator circuit 6 is operated in two different operating states, a first operating state wherein the switch 8 is open and a second operating state in which the switch 8 is closed. In both operating states the output frequency f of the oscillator circuit 6 is determined by the detector unit 10. The output frequency f of the two operating states depends on the capacitors and the inductivity of circuit diagram of FIG. 2 as defined in the following equations. When the switch 8 is open capacitor $C_1$ does not influence the output frequency f and the output frequency $f_0$ of this first operating state can be calculated from equation 1:

$$f_0 = \frac{1}{2\pi} \sqrt{\frac{1}{L_0}\left(\frac{1}{C_0} + \frac{1}{C_3} + \frac{1}{C_2}\right)} \quad (1)$$

When the switch 8 is closed, the capacitor $C_1$ is coupled in parallel to capacitor $C_3$ and the frequency $f_1$ of the oscillator circuit 6 in this second operating state is defined by the following equation 2:

$$f_1 = \frac{1}{2\pi} \sqrt{\frac{1}{L_0}\left(\frac{1}{C_0} + \frac{1}{C_1+C_3} + \frac{1}{C_2}\right)} \quad (2)$$

As the values of the capacitors $C_1$ to $C_3$ are known, the values of the capacity $C_0$ and the inductivity $L_0$ can be determined by measuring frequencies $f_0$ and $f_1$ and using equations 1 and 2 for calculation. Control unit 9 of FIG. 1 may be adapted to perform these calculations and can thus determine the position where the user touches the conductive wire 5 by using a look-up table providing a correlation between the inductivity $L_0$ and the touch position on the headset cable 3. Opening and closing the switch 8 may be performed also by the control unit 9.

While exemplary embodiments have been described above, various modifications may be implemented in other embodiments. For example, the inductivity $L_0$ representing the inductivity of the conductive wire 5 being touched by the user may be determined in any other way by an appropriate electronic circuit adapted to determine an inductivity. Furthermore, the control unit 9 may be adapted to determine from the frequencies $f_0$ and $f_1$ whether the headset cable 3 is touched by a user or not, for example by using predefined frequency ranges for the frequencies $f_0$ and $f_1$ indicating whether the conductive wire 5 is touched by a user or not. Furthermore, the control unit 9 may be adapted to activate or deactivate functions of the electronic device 1 depending on the determined position where the user touches the headset wire 3, for example starting or stopping an audio play back or a skipping to a next or a previous audio track of a playlist. Furthermore, the control unit 9 may be adapted to adjust functions of the electronic device based on the determined position where the user touches the headset cable 3, for example to adjust a volume of an audio reproduction being output from the electronic device 1 to the headset 2.

Finally, it is to be understood that all the embodiments described above are considered to be comprised by the present invention as it is defined by the appended claims.

The invention claimed is:

1. A method for adjusting a function of an electronic device, comprising:
   providing a conductive wire that is coupled to an electronic circuit of the electronic device, the electronic circuit being adapted to generate an output signal depending on an inductivity induced by a user touching the conductive wire,
   receiving, by a detector unit, the output signal of the electronic circuit,
   determining, by the detector unit, the induced inductivity on the basis of the output signal, and
   adjusting, by a control unit, the function of the electronic device depending on the inductivity determined by the detector unit.

2. The method according to claim 1, wherein the electronic circuit comprises an oscillator circuit generating the output signal having a frequency depending on a capacity and the inductivity both influenced by the user touching the conductive wire.

3. The method according to claim 2, wherein the step of determining the inductivity on the basis of the output signal comprises the steps of:
   determining a first frequency of the output signal of the oscillator circuit,
   coupling a capacitive element to the conductive wire,
   determining a second frequency of the output signal of the oscillator circuit with the capacitive element being coupled to the conductive wire, and
   determining the inductivity on the basis of the first frequency and the second frequency.

4. The method according to claim 1, wherein the step of adjusting the function of the electronic device comprises looking up an adjustment in a look-up table, the look-up table providing a correlation between the inductivity and the adjustment.

5. The method according to claim 1, wherein the conductive wire is included in a wire for connecting the electronic device to an accessory.

6. The method according to claim 5, wherein the accessory comprises at least one of a microphone, a headphone or a charger.

7. The method according to claim 5, wherein the electronic device comprises a device selected from the group comprising a mobile phone, a personal digital assistant, a mobile navigation system, a mobile media player, a bluetooth headset controller, and a mobile computer.

8. The method according to claim 1, wherein the step of adjusting the function of the electronic device depending on the determined inductivity comprises:
depending on the determined inductivity, determining a position where the user touches the wire and adjusting the function of the electronic device according to the position.

9. The method according to claim 8, comprising:
determining consecutively a plurality of positions where the user touches the conductive wire by respectively determining the inductivity,
determining a moving direction of the position where the user touches the conductive wire along the conductive wire based on the plurality of positions, and
adjusting the function of the electronic device depending on the determined moving direction.

10. The method according to claim 8, comprising:
determining consecutively a plurality of positions where the user touches the conductive wire by respectively determining the inductivity,
determining a moving speed of the position where the user touches the conductive wire along the conductive wire based on the plurality of positions, and
adjusting the function of the electronic device depending on the determined moving speed.

11. An apparatus for adjusting a function of an electronic device, comprising:
an electronic circuit coupled to a conductive wire of the electronic device, the electronic circuit being adapted to generate an output signal depending on an inductivity of the conductive wire induced by a user touching the conductive wire,
a detector unit receiving the output signal of the electronic circuit and determining the induced inductivity on the basis of the output signal, and
a control unit for adjusting the function of the electronic device depending on the inductivity determined by the detector unit.

12. The apparatus according to claim 11, wherein the electronic circuit comprises an oscillator circuit generating the output signal having a frequency depending on a capacity and the inductivity both influenced by the user touching the conductive wire.

13. The apparatus according to claim 12, comprising
a switching element controlled by the detector unit, and
a capacitive element coupleable via the switching element to the conductive wire,
wherein the detector unit is adapted to
determine a first frequency of the output signal of the oscillator circuit while the capacitive element is not coupled to the conductive wire,
determine a second frequency of the output signal of the oscillator circuit while the capacitive element is coupled to the conductive wire, and
determine the inductivity on the basis of the first frequency and the second frequency.

14. The apparatus according to claim 11, wherein the control unit is adapted to adjust the function of the electronic device by looking up an adjustment in a look-up table, the look-up table providing a correlation between the inductivity and the adjustment.

15. The apparatus according to claim 11, wherein the conductive wire is included in a wire for connecting the electronic device to an accessory.

16. The apparatus according to claim 15, wherein the accessory comprises at least one of a microphone, a headphone or a charger.

17. The apparatus according to claim 11, wherein the electronic device comprises a device selected from the group comprising a mobile phone, a personal digital assistant, a mobile navigation system, a mobile media player, a bluetooth headset controller, and a mobile computer.

18. The apparatus according to claim 11, wherein the control unit is adapted to adjust the function of the electronic device depending on the determined induced inductivity by, depending on the determined inductivity, determining a position where the user touches the wire and adjusting the function of the electronic device according to the position.

19. The apparatus according to claim 18, wherein the apparatus is adapted to:
determine consecutively a plurality of positions where the user touches the conductive wire by respectively determining the inductivity with the aid of the detector unit,
determine a moving direction of the position where the user touches the conductive wire along the conductive wire based on the plurality of positions, and
adjust the function of the electronic device depending on the determined moving direction with the aid of the control unit.

20. The apparatus according to claim 18, wherein the apparatus is adapted to:
determine consecutively a plurality of positions where the user touches the conductive wire by respectively determining the inductivity with the aid of the detector unit,
determine a moving speed of the position where the user touches the conductive wire along the conductive wire based on the plurality of positions, and
adjust the function of the electronic device depending on the determined moving speed with the aid of the control unit.

* * * * *